United States Patent
Sato

[11] 3,853,438
[45] Dec. 10, 1974

[54] ROTOR AND APEX SEAL ARRANGEMENT FOR A LOBED ROTOR AND HOUSING

[75] Inventor: Munefumi Sato, Yokohama, Japan

[73] Assignee: Nissan Motor Company, Limited, Yokohama, Japan

[22] Filed: May 17, 1973

[21] Appl. No.: 361,267

[52] U.S. Cl. ............................ 418/113, 418/123
[51] Int. Cl. ...................................... F01c 19/04
[58] Field of Search .......... 418/113, 117, 122, 123, 418/124

[56] References Cited
UNITED STATES PATENTS

| | | | |
|---|---|---|---|
| 3,102,492 | 9/1963 | Bentele et al................... | 418/122 X |
| 3,161,350 | 12/1964 | Lorcher.......................... | 418/122 X |
| 3,193,189 | 7/1965 | Rastogi.......................... | 418/122 X |
| 3,204,615 | 9/1965 | Starmuehler................... | 418/113 X |

FOREIGN PATENTS OR APPLICATIONS

| | | | |
|---|---|---|---|
| 982,227 | 3/1965 | Great Britain..................... | 418/122 |
| 1,182,471 | 11/1964 | Germany........................... | 418/113 |
| 1,907,039 | 2/1970 | Germany........................... | 418/122 |

Primary Examiner—C. J. Husar
Assistant Examiner—Leonard Smith

[57] ABSTRACT

An apex seal which is provided at the end of a rotor lobe and is oriented at an angle to the radial axis of the lobe in the direction of rotation of the rotor.

1 Claim, 6 Drawing Figures

ROTOR AND APEX SEAL ARRANGEMENT FOR A LOBED ROTOR AND HOUSING

The present invention relates to rotary motion devices having lobed rotors and housings, and, more particularly to the configurations of rotors and apex seals for use in the rotary motion devices. While the rotor and apex seal arrangement proposed in the present invention may find various other useful applications such as in pumps and motors operating on rotary motion principles, the same will be herein described by way of example as being incorporated into an automotive rotary piston engine.

The rotary piston engine generally makes use of a multi-lobed, usually three-lobed rotor which rotates within a trochoidal chamber formed in a rotor housing. The rotor and the rotor housing define therebetween working spaces which are hermetically sealed from each other by means of apex seals respectively corporated in the lobes of the rotor. The apex seals in the rotary piston engine correspond in effect to piston rings in reciprocating piston engines and, thus, should provide complete, continuous sealing between the rotor lobes and the internal surface of the trochoidal chamber. The apex seal typically has an end surface which is formed with a radius which is selected to provide efficient sealing between the apex seal and trochoidal housing inner surface.

The rotor not only rotates about its axis but revolves eccentrically around and engine output shaft with the apex seals constantly being held in sliding contact with the internal surface of the trochoidal chamber. To substantially maintain sealing between the rotor lobes and the internal surface of the trochoidal chamber, each of the apex seals should preferably be forced against the chamber inner surface with an appropriate force which results from inertial forces and gas pressure imparted to the apex seal and a spring force urging the seal toward the inner surface of the chamber. The forces thus forcing the apex seals against the internal surface of the rotor housing will tend to accelerate the wear of the seals and the trochoidal chamber and for this reason, it is strongly desired that the forces be reduced to such an extent as not to impair the performance of the rotary piston engine.

It is known in the art that the apex seals rotate in relation to the internal surface of the trochoidal chamber as a result the rotational motion of the rotor about its axis and eccentric motion of the rotor axis about the engine output shaft. Thus, the angle between the radial axis of the rotor lobe at each of the apex seals and a normal to the trochoid at the point of sealing changes as the rotor rotates about its axis and revolves around the eccentric shaft. This angle is called the leaning angle, and it is also known that the contact point between the rounded end surface of the apex seal and the internal surface of the trochoidal chamber rotates within a certain angular range.

The present invention contemplates provision of an improved rotor and apex seal arrangement in which the forces forcing the apex seals against the internal surface of the trochoidal chamber are reduced without sacrificing the performance of the rotary piston engine through modification of the configuration of the rotor and apex seals.

To achieve this end, the rotor and apex seal arrangement includes apex seals each of which has a rounded end surface with a center of curvature which lies on the radial axis of each respective lobe but has a longitudinal axis which is oriented at an angle to the radial axis of each respective lobe in the direction of rotation of the rotor.

The features and advantages of the rotor and apex seal arrangement according to the present invention will become more apparent from the following description taken in conjunction with the accompanying drawings in which.

Figure 1:
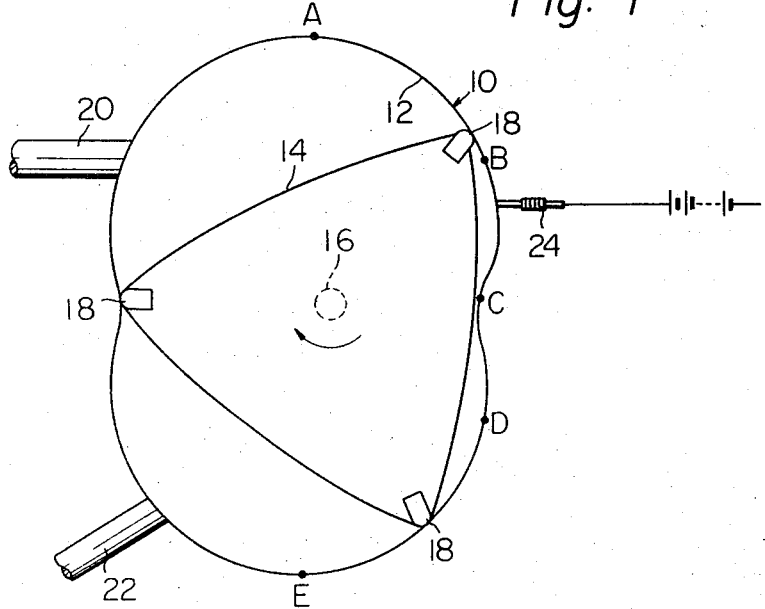
FIG. 1 is a schematic view showing a general arrangement of a typical rotary piston engine.
Figure 2:
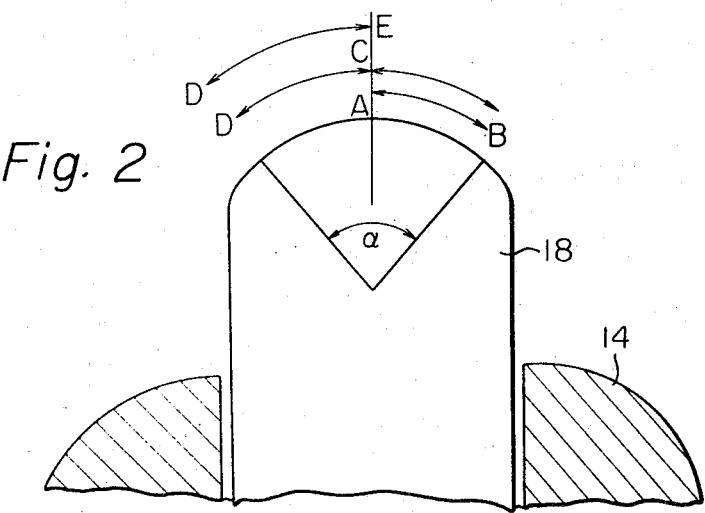
FIG. 2 is a fragmentary sectional view showing an apex seal and a lobe portion of a rotor carrying the apex seal in the rotary piston engine illustrated in FIG. 1.

Reference will now be made to FIGS. 1 and 2 to analyse the leaning motion of the apex seal of a usual rotary piston engine. The rotary piston engine is herein shown as comprising, as customary, a rotor housing 10 defining therein a trochoidal chamber 12, a three-lobed rotor 14 rotatable about an eccentric portion 16 of an output shaft extending through a side housing, not shown, and apex seals 18 incorporated in the lobes (no numeral) of the rotor 14 and in sliding contact with the internal surface of the trochoidal chamber 12 at their rounded end surfaces. Designated by reference numerals 20 and 22 are inlet and outlet ports for a combustible mixture and exhaust gases respectively, and by a reference numeral 24 is an ignition plug. The more detailed construction and the operation of the rotary piston engine are well known in the art and, as such, will not be herein described.

In FIG. 1, points A to E are designated on the contact surface between the rounded end surfaces of the apex seals 18 and the internal surface of the trochoidal chamber 12 for analysing the leaning motion of the apex seals 18. When, now, one apex seal 18 slides along the internal surface of the trochoidal chamber 12 between these points A to E as the rotor 14 rotates about the shaft 16 and the engine output shaft, the contact point between the rounded end surface of the apex seal 18 and the internal surface of the trochoidal chamber 12 revolves around the end surface of the apex seal 18 within an angular range of $\alpha$ as shown in FIG. 2.

Figure 3:
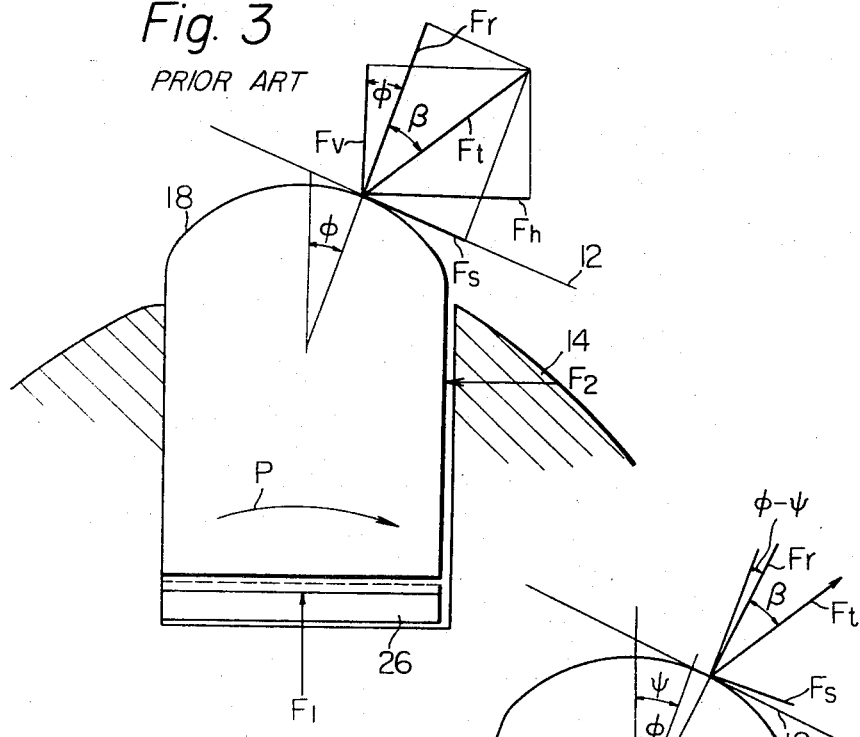
FIG. 3 is a schematic view showing forces acting on the apex seal during operation of a usual rotary piston engine.

FIG. 3 shows forces imposed on an apex seal 18 oriented at a leaning angle $\phi$ to the internal surface of the trochoidal chamber 12, wherein a reference numeral 26 designates a spring which urges the apex seal 18 radially outward from the rotor 14. During operation in which the rotor 14 and accordingly the apex seal 18 rotate in the direction of an arrow P, the apex seal 18 is subjected to a force $F_1$ exerted radially thereon by the spring 26, and a force $F_2$ imposed perpendicularly thereto by a transverse inertial force and gas pressure. The apex seal 18 is thus pressed against the internal wall of the trochoidal chamber 12 by a force resulting from these forces $F_1$ and $F_2$, thereby inviting accelerated wear of the rounded end portion of the apex seal 18 and the internal wall of the trochoidal chamber 12 as previously pointed out.

If, now, the forces of reaction to the forces $F_1$ and $F_2$ are $Fv$ and $Fh$, respectively, then a resultant force $Ft$ is exerted at the point P of contact between the rounded end surface of the apex seal 18 and the internal surface of the trochoidal chamber 12. The force $Ft$ can be decomposed into components $Fr$ and $Fs$ which are respectively perpendicular and tangent to the end surface of the apex seal 18 at the point P so that, if the coefficient of sliding friction between the end surface of the apex seal 18 and the internal wall of the trochoidal chamber 12 is $\mu$, then $$\mu = \tan\phi = Fs/Fr.$$

Eq. 1

The force $Fr$ acts to press the apex seal 18 against the internal surface of the trochoidal chamber 12 and can be written in the form $$Fr = Fv \times \cos\beta/\cos(\phi + \beta),$$

Eq. 2 where $\beta$ is an angle formed between the directions of the forces $Ft$ and $Fr$. Letting $Fv = F_1$, Eq. 2 can be rewritten $$Fr = F_1 \times \cos\beta/\cos(\phi + \beta)$$

Eq. 3

Figure 4:
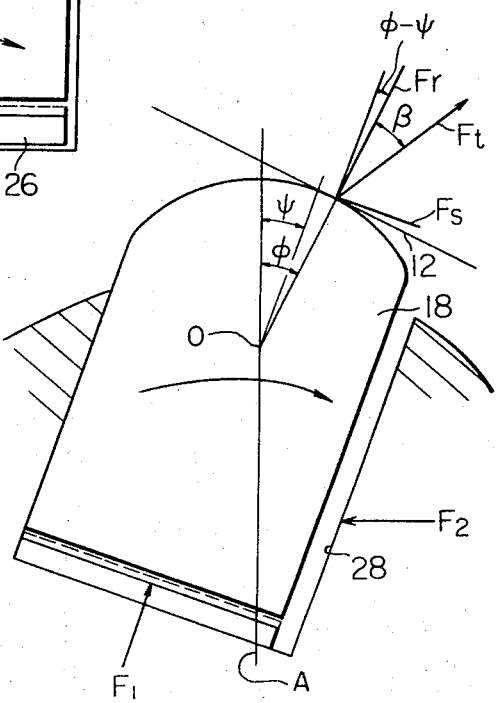
FIG. 4 is a fragmentary sectional view showing a preferred embodiment of a rotor and apex seal arrangement according to the present invention.
Figure 5:
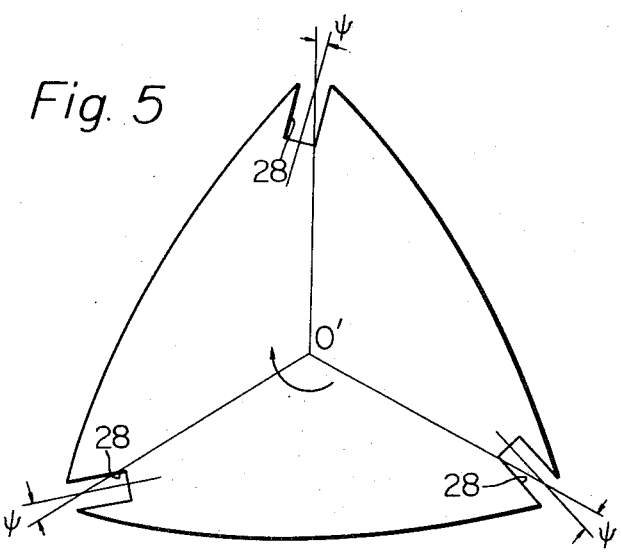
FIG. 5 is a schematic view showing an overall configuration of the rotor in the rotor and apex seal arrangement illustrated in FIG. 4.
Figure 6:
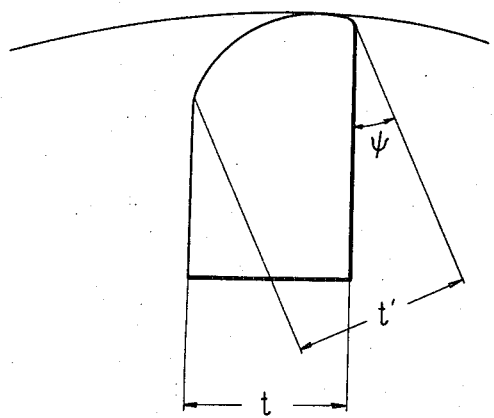
FIG. 6 is a schematic view showing a configuration of the apex seal of the rotor and apex seal arrangement illustrated in FIG. 4, and that of a conventional rotary piston engine.

From this it will be apparent that since the values $\beta$ and $F_1$ are constant irrespective of the rotational position of the rotor 14 relative to the trochoidal chamber 12, the force $Fr$ can be reduced if the value of $\phi$ is reduced. FIGS. 4 to 6 illustrate a preferred embodiment of a rotor and apex seal arrangement according to the present invention to achieve this purpose.

As illustrated in FIG. 4, the apex seal 18 of the rotor and apex seal arrangement embodying the present invention is oriented an angle $\Psi$ in the direction of rotation of the rotor 14 to the radial axis A of the respective lobe of the rotor but the center O of curvature of the rounded end surface of the apex seal 18 lies on the radial axis A of the respective rotor lobe, and accordingly the force Fr applied perpendicularly to the end surface of the apex seal 18 is significantly reduced as will be understood from comparison between Eq. 3 and following equation:

$$Fr = F_1 \times \cos\beta/\cos(\phi - \Psi + \beta).$$

Eq. 4

To comply with the above described configuration of the apex seal 18, the rotor 14 has formed in the end portions of its lobe grooves 28, each of which is oriented at the angle $\Psi$ in the direction of rotation of the rotor to the radial axis A of the lobe as seen in FIG. 5.

FIG. 6 illustrates the difference between the configurations of a prior art apex seal indicated by a broken line and an apex seal implementing the present invention as indicated by a solid lines. As is clearly seen in FIG. 6, the apex seal of the rotor and seal arrangement according to the present invention has an end surface which is rounded to be congruent with the rounded end surface of the prior art apex seal. However, the apex seal herein proposed has a thickness $t$ which is significantly less than the thickness $t'$ (wherein $t = t' \cos \Psi$) of the prior art apex seal as a result of the specific configuration of the former.

It will now be appreciated from the foregoing description that the force imposed between the apex seals and the internal surface of the trochoidal chamber can be reduced, and accordingly they are subjected to lessened wear because the apex seals are oriented at an angle to their respective rotor lobes.

What is claimed is:

1. In a lobed rotor and lobe apex seal arrangement of a rotary motion device, wherein the rotor is arranged to rotate in an enclosure with apex seals in continuous contact with a trochoidally formed inner wall of the enclosure, the improvement comprising a rounded top surface formed on each apex seal, said each apex seal being inclined in the direction of rotor rotation from a radial center plane in which a radial center line of a respective rotor lobe lies, and the center of curvature of said rounded top surface lying in said radial plane.

* * * * *